(12) United States Patent
Fischer et al.

(10) Patent No.: US 8,682,996 B2
(45) Date of Patent: Mar. 25, 2014

(54) APPARATUS FOR HANDLING MESSAGE RECEPTION

(75) Inventors: Dirk Fischer, Hainburg (DE); Stefan Frank, Bingen (DE); Wolf Fronauer, Schlangenbad (DE); Uwe Moslehner, Dreieich (DE); Markus Heigl, Dietzenbach (DE); Andre Marth, Langen (DE); Martin Feuerstack-Raible, Mannheim (DE)

(73) Assignee: Fujitsu Semiconductor Limited, Yokohama (JP)

( * ) Notice: Subject to any disclaimer, the term of this patent is extended or adjusted under 35 U.S.C. 154(b) by 416 days.

(21) Appl. No.: 12/949,474

(22) Filed: Nov. 18, 2010

(65) Prior Publication Data
US 2011/0131284 A1 Jun. 2, 2011

(30) Foreign Application Priority Data
Nov. 30, 2009 (EP) .................... 09177485

(51) Int. Cl.
*G06F 15/16* (2006.01)
(52) U.S. Cl.
USPC ........... 709/207; 709/204; 709/206; 370/389; 370/412
(58) Field of Classification Search
USPC ................ 709/204, 206, 207; 370/389, 412
See application file for complete search history.

(56) References Cited

U.S. PATENT DOCUMENTS

| | | | |
|---|---|---|---|
| 5,299,313 A | 3/1994 | Petersen et al. | |
| 5,305,321 A | 4/1994 | Crayford | |
| 5,343,471 A | 8/1994 | Cassagnol | |
| 5,473,607 A * | 12/1995 | Hausman et al. | 370/392 |
| 5,479,441 A | 12/1995 | Tymes et al. | |
| 5,983,275 A | 11/1999 | Ecclesine | |
| 6,327,625 B1 * | 12/2001 | Wang et al. | 709/235 |
| 6,363,069 B1 | 3/2002 | Levy et al. | |
| 6,381,648 B1 | 4/2002 | Broberg, III et al. | |
| 6,407,999 B1 | 6/2002 | Olkkonen et al. | |
| 6,408,006 B1 | 6/2002 | Wolff | |
| 6,519,263 B1 | 2/2003 | Huth | |
| 6,535,514 B1 | 3/2003 | Gordon et al. | |
| 6,570,884 B1 * | 5/2003 | Connery et al. | 370/419 |
| 6,658,480 B2 | 12/2003 | Boucher et al. | |
| 6,662,247 B1 | 12/2003 | Ales et al. | |
| 6,753,873 B2 | 6/2004 | Dixon et al. | |
| 6,938,040 B2 | 8/2005 | Allison et al. | |
| 7,013,482 B1 | 3/2006 | Krumel | |
| 7,586,953 B2 * | 9/2009 | Forest et al. | 370/503 |
| 7,979,594 B2 * | 7/2011 | Bartling | 710/5 |
| 2004/0170195 A1 * | 9/2004 | Slivkoff et al. | 370/474 |

FOREIGN PATENT DOCUMENTS

WO WO 2004/059448 A2 7/2004

OTHER PUBLICATIONS

Powelink Enhanced Ethernet MAC IP Core, IEEE 802.3 specification, http://standards.ieee,org/getieee802.

* cited by examiner

*Primary Examiner* — Liangche A Wang
*Assistant Examiner* — Cheikh Ndiaye
(74) *Attorney, Agent, or Firm* — Arent Fox LLP (57) ABSTRACT

Apparatus for handling received messages, the apparatus comprising: a communication-interface controller operable on behalf of a processor to intercept and screen received messages on the fly portion-by-portion during reception, and to submit those messages determined to have passed such screening to the processor for processing.

11 Claims, 5 Drawing Sheets

APPARATUS FOR HANDLING MESSAGE RECEPTION

The present invention relates to message reception. In particular, the present invention relates to apparatuses for handling received messages, and to corresponding methods. Such messages may be, for example, frame or packet-based messages, such as Ethernet messages.

Ethernet MAC functionality is considered to be of importance in microcontrollers. Such microcontrollers are envisaged for use in industrial and automotive applications in general, as well as in real-time applications per se.

By way of example, industrial real-time Ethernet protocols (e.g. Ethernet Powerlink or Profinet) require a fast response time in respect of requests. In order to support these kinds of protocols, new hardware features are desirable. However, it is envisaged that general-purpose applications may also benefit from such features.

It is desirable to unburden a microcontroller processor or central processing unit (CPU) from analysing incoming messages (requests) to save computing time, to ensure the reception of important messages even under heavy bus load, and to ensure that a microcontroller may be able to provide a fast response time to requests.

Previously-considered communication-interface controllers have filter reception mechanisms. However, such controllers are considered to have disadvantages, as follows.

One previously-considered type of communication-interface controller implements a perfect destination address filter. Incoming messages are accepted if the destination address matches with the station address of the receiver, and other messages are rejected. Only a small part (the destination address) of the incoming message is compared with a filter value (the station address). This predefined message fragment is fixed in terms of length and location within the message.

To support the filtering/acceptance of more than one destination address, hash table filters may be implemented. Similar to the perfect address filters, only a fixed message fragment is compared, namely the station address. A hash code is calculated from the destination address in the message. This code is used to access the hash table which contains an acceptance flag for each table entry. If the acceptance flag is cleared, the corresponding message is rejected. The hash table is an imperfect filter, since several destination addresses can lead to the same hash key. Therefore, packets may be accepted even though they should have been rejected.

Previously-considered controllers tend to have one reception buffer queue. If this queue (the reserved memory) is fully occupied, no further messages may be received until the processor (i.e. the software) has processed the stored received messages. Particularly under high bus load, important incoming messages may get lost because the software was not able to process the messages fast enough to identify important ones.

Although the general principle of automatic transmission of a predefined message upon a filter match is known (see, for example, the Industrial Ethernet MAC specification of Port GmbH), it is considered that such automatic transmission could be handled in a preferred manner.

The following prior-art documents have been identified: U.S. Pat. No. 6,535,514; U.S. Pat. No. 6,519,263; U.S. Pat. No. 6,753,873; U.S. Pat. No. 5,479,441; U.S. Pat. No. 6,662,247; U.S. Pat. No. 6,407,999; U.S. Pat. No. 6,363,069; U.S. Pat. No. 6,408,006; U.S. Pat. No. 5,983,275; U.S. Pat. No. 5,299,313; U.S. Pat. No. 5,305,321; U.S. Pat. No. 6,381,648; U.S. Pat. No. 5,343,471; U.S. Pat. No. 6,938,040; and U.S. Pat. No. 6,658,480.

It is desirable to provide apparatuses and methods in view of the above.

According to an embodiment of a first aspect of the present invention, there is provided apparatus for handling received messages, the apparatus comprising: a communication-interface controller operable to screen received messages on the fly portion-by-portion during reception (i.e. as they are received), and to submit (only) those messages determined to have passed such screening to a processor for processing. Such a controller may function essentially on behalf of a processor, intercepting its received messages and screening them so as to reduce the burden on the processor.

The apparatus may comprise the processor. The processor may, for example, be a CPU (central processing unit) of the apparatus. The apparatus may comprise a FIFO buffer for receiving messages portion-by-portion and screening the portions as they are received.

By screening received messages on the fly, preferably in hardware, it is possible to save system resources such as memory and buffer space. It is then, for example, not necessary to store complete messages before they are screened, possibly en bloc.

The apparatus may, for example, have a bus such as an internal bus connecting the processor to the controller. Preferably, the apparatus is configured to carry out such screening before passing received messages to the bus, so as not to risk burdening the processor.

For each received message, the controller may be operable during the screening to compare user-selected bits of the message with corresponding bits of a test string, and to determine whether the message has passed the screening in dependence upon such comparison. That is, the apparatus may be operable to compare any bits of the received message, e.g. other than address bits or header bits, or a selection of bits distributed across different parts of the message (preamble, header, data, footer, etc.), with corresponding bits of a test string.

The controller may be operable, when carrying out the comparison, to employ a mask string in conjunction with a test string so as to mask particular bits of the test string from the comparison. The combination of mask strings and test strings may increase the possible different screening processes that the apparatus is able to perform. For example, one test string may be useable with many mask strings, or vice versa.

The apparatus may comprise a first memory for storing one or more said test strings and/or mask strings. The controller may comprise the first memory. The apparatus may be configured to enable a user to store desired strings in the first memory. In that way, a user may be able to configure the apparatus to screen received messages in a particular way. Such flexibility is advantageous.

The apparatus may comprise a second memory for storing a configuration setup corresponding to stored said strings, the configuration setup referring to the strings stored in the first memory. The controller may comprise the second memory.

The first and second memories may be parts of the same memory. The sizes of the first and second memories may be controlled dynamically, for example depending on the demand for space in those memories. In this way, memory use may be optimised.

By way of such a configuration setup, it may be possible to define which strings or combinations of strings (e.g. test and mask strings) are to be employed during the screening process. In this way, it may be possible to freely configure the apparatus. For example, the configuration setup may be used to define an order in which strings are to be employed during the configuration.

The controller may be configured to employ a stored said configuration setup to retrieve corresponding stored said strings from the first memory to carry out the screening. The controller may be operable to employ a stored said configuration setup to determine which combinations of stored test and/or mask strings are to be compared against received messages.

For flexibility of use, the apparatus may be configured to enable a user to store desired strings in the first memory and a corresponding configuration setup in the second memory, so as to configure the controller to subject (any) desired bits of a said received message to comparison with one or more desired said test string and/or mask string.

The controller may be configured, for each received message, to carry out the comparison in a series of stages. As mentioned below, a FIFO (first-in-first-out) buffer may be employed. Each such stage may comprise comparing a portion of a received message with a corresponding portion of a said test string and/or a said mask string.

The controller may comprise a FIFO buffer, and be configured to carry out the stages sequentially during reception of the message concerned, successive stages operating on respective portions of a particular received message successively received into the FIFO buffer. A state machine may control this process.

The controller may be configured, in each stage, to compare the portion of a received message concerned with a corresponding portion of each stored test string and/or mask string, or of each stored test string and mask string combination, as indicated by a said stored configuration setup. In this way, the screening process may effectively deal fully with each received chunk of a message before receiving another chunk into the FIFO buffer. In this way, the screening may be carried out on the fly.

The controller may be operable, in dependence on the screening, to determine whether received messages are of a first priority or of a second priority, the first priority being higher in priority than the second priority. Advantageously, such priority information may be derived during the screening process, so that subsequent processing of messages by the processor may focus on high-priority messages. The screening may of course be employed to sort messages into further levels of priority, or based on a sorting factor other than priority, such as by receipt time or by sender.

The controller may comprise first and second message buffers, and may be operable to store messages determined to have the first priority in the first message buffer and messages determined to have the second priority in the second message buffer, the first buffer being reserved for such first-priority messages. The sizes of the first and second buffers may be controlled dynamically, for example depending on the demand for space in those buffers. For example, the first and second buffers may be part of the same buffer. In this way, buffer use may be optimised.

The controller may be operable to signal receipt of such a first-priority message to the processor. In this way, the processor may (for example, by way of interrupt) be able to deal quickly with important messages. Such important messages may require a fast response time, for example in real-time applications.

The FIFO buffer may be a first FIFO buffer, and the controller may have a second FIFO buffer for holding screened portions of a particular received message whilst such determination as to whether the message concerned is of the first or second priority is completed, which screened portions have already been subjected to comparison whilst held in the first FIFO buffer. This arrangement advantageously supports the capability to screen messages on the fly, by providing capacity to hold received parts of a message until a particular stage of the screening (for example, as to priority or as to another sorting factor) is complete.

The first and second FIFO buffers may be parts of a single FIFO buffer. The controller may be operable to dynamically control the lengths of the first and second FIFO buffers within the single FIFO buffer. In this way, buffer use may be optimised.

The single FIFO buffer may be distributed over separate physical units, but be operated logically as a single buffer. The same may naturally be true for the various other memories and buffers mentioned above.

The controller may be operable, for messages determined to have passed the screening, to transmit a predefined reply message. In this way, replies may be issued quickly, for example before a message has been processed by the processor.

The apparatus may comprise the processor. The controller may be operable to signal to the processor the beginning of reception of a said message, and the processor may be operable, in dependence upon such a signal, to prepare a response to the message at least partly during said reception. In this way, the time during which a message may be received, which may for example be several milliseconds or tens of milliseconds long depending on the application, may be employed usefully by the processor to prepare such a response. The response may be, for example, a reply message or some other response such as the output of a response signal. The controller may be operable to determine, early on during reception (which may still be considered to be at the beginning of the reception) whether such a signal should be sent to the processor, so that the processor only receives such a signal for certain (e.g. important) messages.

The controller is preferably implemented in hardware.

The present aspect extends to a microcontroller comprising such apparatus, and to equipment comprising such a microcontroller. Such equipment may, for example, be an industrial robot.

According to an embodiment of a second aspect of the present invention, there is provided a method of handling received messages, the method comprising: screening received messages on the fly portion-by-portion during reception, and submitting (only) those messages determined to have passed such screening to a processor for processing.

Features of apparatus aspects apply to method aspects, and vice versa.

Reference will now be made, by way of example only, to the accompanying drawings, of which.

Embodiments of the present invention may be introduced generally as providing a flexible filter mechanism. Incoming messages or fragments thereof may be compared with user-defined values. Upon filter match, the incoming message may be discarded or accepted, the incoming message may be identified as a high priority message and transferred to a dedicated reception buffer, and the automatic transmission of a prepared, or pre-existing or stored message may be triggered. Embodiments of the present invention may be considered to be efficient, flexible, and implementable at low cost.

In one embodiment, incoming Ethernet messages as an example type of message may be preselected and processed (in the sense of being handled) without interaction of the CPU. As will become apparent, embodiments of the present invention may allow flexible and versatile handling of messages arriving from an Ethernet network. The filter mechanism may be used to identify high priority messages and ensure the reception and storage of these messages even under high network (network bus) load.

Generally speaking, a communication network comprises several nodes, exchanging data packets with each other. In bus topology networks, every node is typically able to receive every transmitted message, regardless of the intended destination address(es).

One disadvantage of such a network is the potential risk of overloading single nodes. The receiver node generally needs to check whether an incoming message is to be processed or whether it can be discarded because it is intended for another node. If these checks are performed by software, CPU computing capacity which would otherwise be available for other applications running on that node must be reserved for message handling. Under high network load, messages may get lost because of buffer overflows. For example, the CPU may not be able to handle received messages fast enough.

It is desirable to unburden the CPU, and embodiments of the present invention approach this desideratum by selecting (pre-processing or handling) incoming messages in hardware. Moreover, embodiments of the present invention provide a solution which is flexible in terms of length of compare strings, flexible in the location of the part or parts of the message compared with such a compare string or strings, and cost efficient in implementation.

Figure 1:
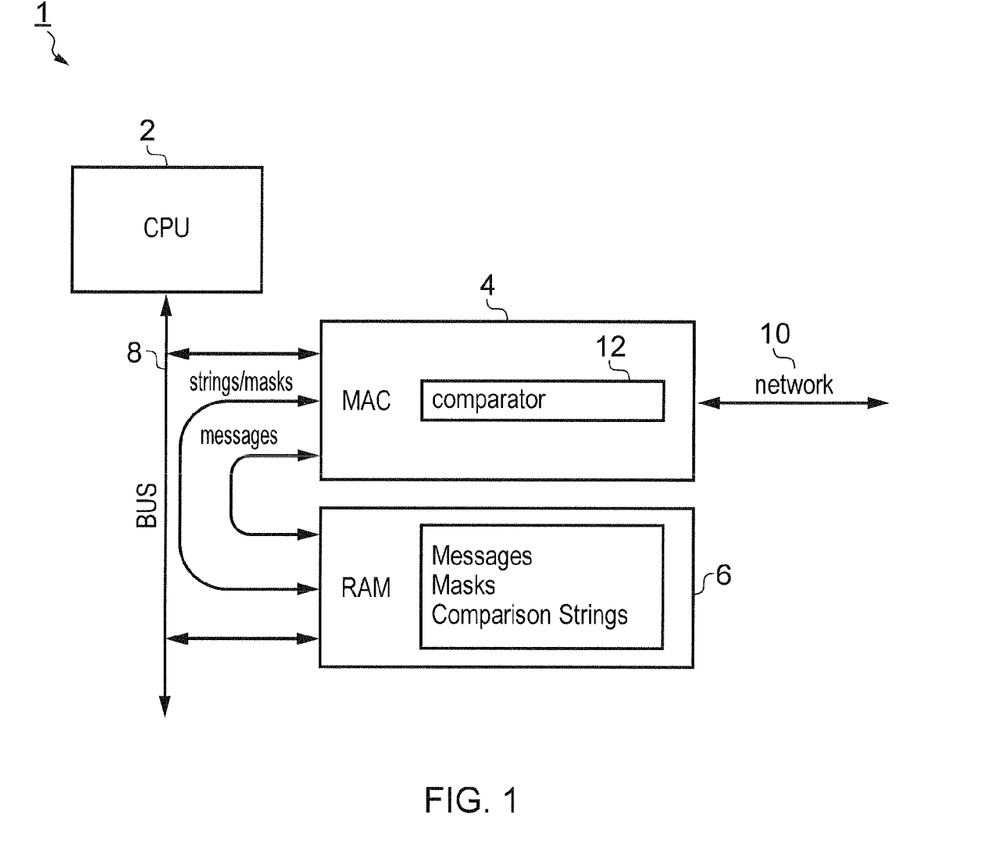
FIG. 1 is a schematic diagram of a system embodying the present invention.

FIG. 1 is a schematic diagram of a system 1 embodying the present invention. System 1 may, for example, be part of a microcontroller intended to serve as a node on an Ethernet network. It will however be appreciated that system 1 may be part of another device, for example an ASIC (Application-Specific Integrated Circuit), an FPGA (Field-Programmable Gate Array) or a standalone MAC (Media Access Controller). It will also be appreciated that system 1 may be intended to form part of a node on a type of network other than an Ethernet network, for example any network with a logical bus topology.

System 1 comprises a processor or CPU 2, a media-access controller (MAC) 4, a memory 6 such as a random-access memory (RAM), internal connections 8 such as bus connections, and external terminals or similar 10 for connection to a network.

Controller 4, when in use, is connected directly or indirectly to a network via terminals 10 so as to receive incoming messages therefrom. The network may be, for example, a LAN such as a WLAN, or any part of parts of a wider network such as the Internet. Such messages may be considered to be packets or frames of information, for example comprising data portions and associated management information such as headers, footers, preambles, and the like. Information regarding the structure of Ethernet frames, as being one example type of message, may be found in the IEEE 802.3 specification (available at http://standards.ieee.org/get-ieee802). As is well known, IEEE 802.3 is a collection of IEEE standards defining the Physical Layer and Data Link Layer's media access control (MAC) sub-layer of wired Ethernet.

Controller 4 comprises a filter 12 which may be implemented as a comparator as shown in FIG. 1. The filter 12 itself is located within the controller 4 near to a part of it (a reception unit) that receives messages from the network.

Memory 6 is connected to controller 4 via internal connections 8. In use, or following setup by a user, or during manufacture, mask- and compare-strings are stored in the memory 6. During use, incoming (and outgoing) messages may also be stored in memory 6. Memory 6 may, for example, be a general system memory, for example of a larger device such as a microcontroller having system 1.

System 1 is configured to operate according to the following principle.

A message may be regarded as a string of bytes. To select a message for further handling (e.g. software processing by the processor 2) or to reject it as irrelevant, the message byte string or fragments of it may be compared with user-defined strings. These user-defined strings (test strings) may be stored in system memory (such as memory 6) and have arbitrary locations and lengths. A descriptor table may also be stored in memory 6, detailing information about the start address and the number of bytes for each stored string.

Mask strings (which may also be user defined) may optionally also be stored in the same manner. Such mask strings specify which fragments of an incoming message are to be compared with the user-defined strings. One mask string may be assigned to several test strings, or, conversely, one test string may be assigned to several mask strings. Such combinations may be detailed in the descriptor table. In another embodiment, registers may be employed to implement the use of such combinations, for example with one mask string assigned to several test strings: Such test strings may be referred to as compare strings.

Since incoming messages may consist of hundreds of bytes (for example, 1500 bytes) and the length of compare strings is flexible in the present embodiment, system 1 is configured to perform message and string comparison (as a screening function) sequentially, on the fly, portion-by-portion (e.g. chunk-by-chunk), during message reception (rather than by comparing messages and strings en bloc). This saves on system resources (memory, buffers, etc.) and thus leads to a low cost implementation.

Figure 2:
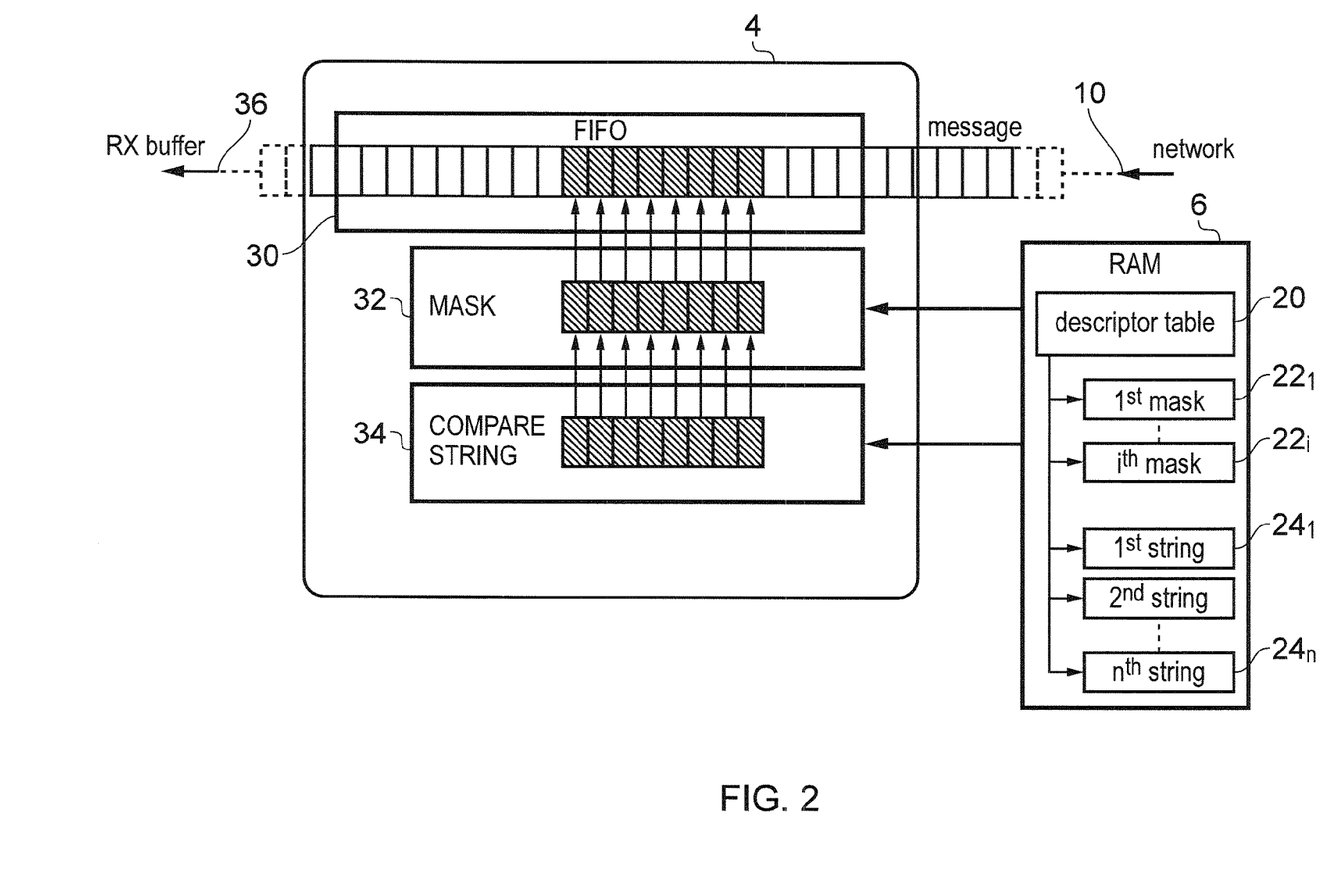
FIG. 2 is a schematic diagram representing parts of the system of FIG. 1.

FIG. 2 is a schematic diagram representing parts of system 1.

Memory 6 is shown as having a descriptor table 20, $1^{st}$ to $i^{th}$ mask strings $22_1$ to $22_i$, and $1^{st}$ to $n^{th}$ compare strings $24_1$ to $24_n$ stored therein. Controller 4 is shown with its comparator function implemented by way of a first-in-first-out (FIFO) buffer 30, a mask string buffer 32 and a compare string buffer 34. It will be appreciated from FIG. 2 that incoming or received messages may pass, on the fly, through the FIFO buffer 30 from the network via the external terminals 10 and to a receive (RX) buffer 36. Receive buffer 36 may be part of memory 6.

After the reception of a message portion or chunk of a certain size (for example, the data-bus width of the system 1), a comparison or screening cycle may be started. In system 1, a comparator state machine (not shown) being part of controller 4 fetches an equally sized portion of the 1st compare string and, if applicable, the corresponding part of a related mask-string from system memory 6. It will be appreciated that the portions of the message, compare string and mask string need not be the same size as one another. Information about the location and length of these byte strings is stored in a descriptor table which is accessed by the comparator state machine.

After the fetch is completed, the compare step is performed, as indicated by upwardly-pointing arrows in FIG. 2. If the comparison result for this portion of the compare string is a non-match, further comparison using this particular compare string may be deemed unnecessary, and accordingly it may be excluded from further processing.

The fetch/compare cycle is repeated for every compare string listed in the descriptor table (each time optionally employing a corresponding portion of a mask string), or in a part of the descriptor table. The maximum number of compare and mask strings that may be employed per portion of an incoming message depends on the available bandwidth for memory transfers (fetching of string portions) and the data rate of the incoming message. For example, when performing the screening on the fly, comparison of all strings must be completed before the reception FIFO buffer has to be cleared to allow the insertion of further message data.

The overall match/non-match result for a compare string is determined either after the string is excluded due to non-match or the string is successfully compared until the end, leading to a match for that string.

Figure 3:
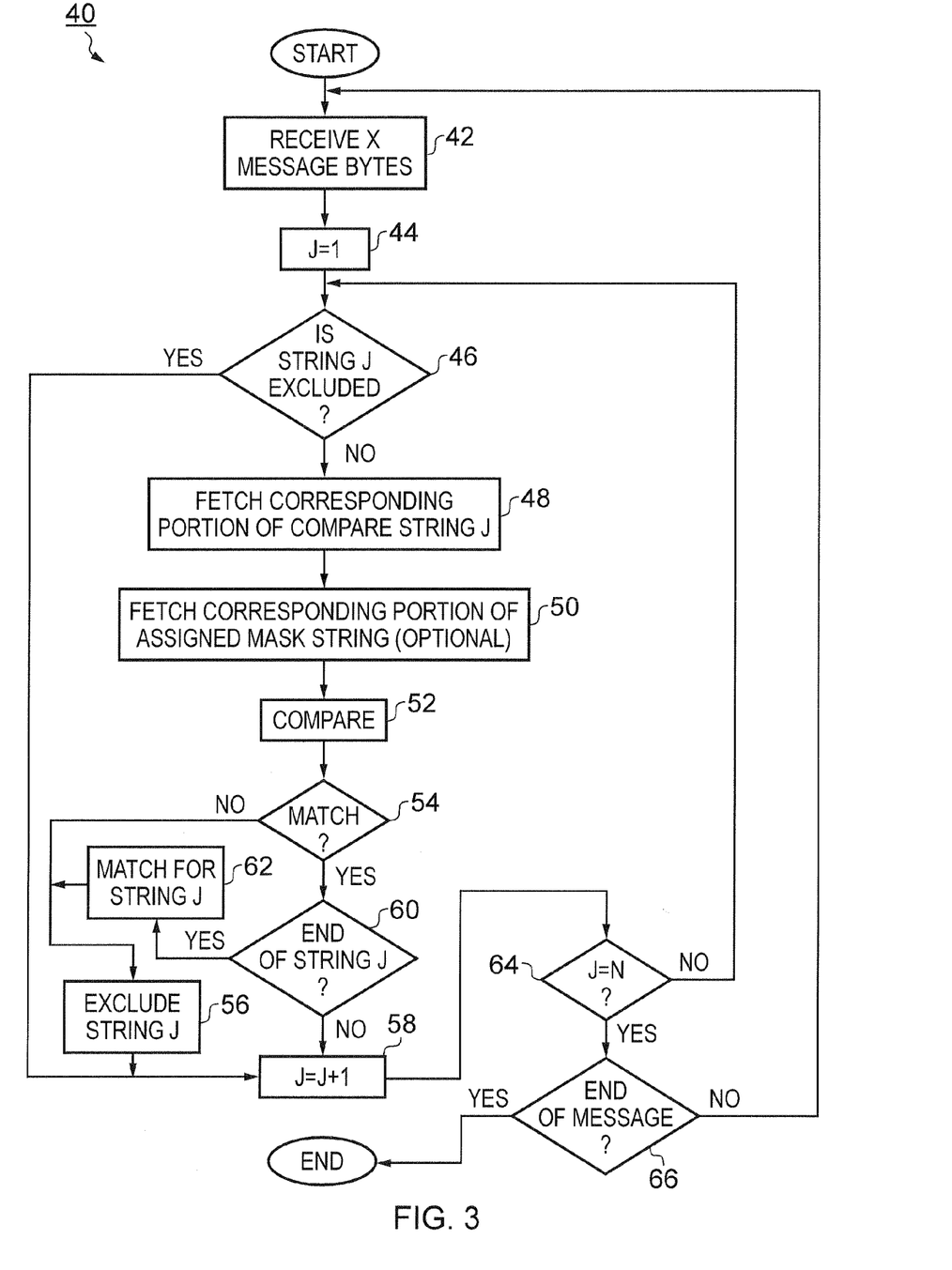
FIG. 3 is a flowchart of a method which may be implemented by the system of FIG. 1.

FIG. 3 is a flowchart of a method 40 which may be implemented by system 1. Method 40 comprises steps 42 to 66.

In step 42, a portion (number of bytes) of a message is received, in this case comprising X bytes. The method then proceeds to step 44 in which a variable J is initialised to the value 1. In the following step 46, a decision is made as to whether compare string J has been excluded from the comparison process. If string J has been excluded (YES, step 46), the method proceeds to step 58 discussed below. If string J has not been excluded (NO, step 46), the method proceeds to step 48.

In step 48, a portion of compare string J corresponding to the portion of the received message is fetched, for example, from memory 6. In the following step 50, which is an optional step, a portion of a mask string (corresponding to the portion of the received message and the fetched portion of the compare string) is also fetched, for example from memory 6. The mask string may be a mask string assigned to compare string J, and possibly also to other compare strings.

In step 52, comparison between the fetched string portion (s) and the received portion of the message is performed. In the following step 54, it is determined if the result of the comparison is a match, or not.

If a match is not found (NO, step 54), the method proceeds to step 56 in which string J is excluded from further comparison. In that case, the method then proceeds to step 58 in which the value of variable J is incremented.

If, however, a match is found (YES, step 54), the method proceeds to step 60 in which it is determined whether the end of string J has been reached, i.e. whether the portion fetched in step 48 was the last portion of that string. If the end of string J has been reached (YES, step 60), the method proceeds to step 62 where it is recorded that a match for string J has been found. It will be appreciated that step 62 would only be reached if a match had been found for every portion of string J. The method then proceeds to step 56, where compare string J is excluded from further comparison (since it has been fully compared), and on to step 58, where the value of the variable J is incremented. If the end of string J has not been reached (NO, step 60), the method proceeds to step 58, again where the value of the variable J is incremented.

From step 58, the method proceeds to step 64, where it is judged or determined whether the value of variable J is equal to N, where N is the number of compare strings to be compared. If J is not equal to N (NO, step 64), the method returns to step 46. In this way, for each received portion of the message, a corresponding portion of each non-excluded compare string (and optionally also of a mask string) is compared with that message portion. If J is equal to N (YES, step 64), indicating that for the current received portion of the message corresponding portions of all of the non-excluded compare strings have been fetched and compared, then the method proceeds to step 66.

In step 66, it is judged whether the end of the received message has been reached, i.e. whether the portion of the message received in step 42 was a final portion of the message. If the end of the message has not been reached (NO, step 66), the method returns to step 42. In this way, the above-described method can be repeated for each received portion of the message, as it is received (i.e. on the fly), until the end of the message is reached. If the end of the message has been reached (YES, step 66), the method ends. Of course, the method may be repeated for each received message.

Method 40 may be considered to be a comparator algorithm, and may be implemented in hardware, for example by a state machine. Such a state machine may have byte counters to track the position within a received message (frame). Configuration of the test string/mask string assignment may be stored in registers.

As described above by way of example, the comparison results can be used to preselect or pre-process messages in order to reduce CPU load. For example, system 1 may be configured to only accept messages (for passing on to the CPU) on comparison match. Depending on how the compare strings are set up, of course system 1 may be configured to only accept messages on comparison mismatch. Similarly, system 1 may be configured to only reject messages on comparison match or mismatch.

In one embodiment, system 1 is configured for automatic transmission of a predefined message upon comparison match (or mismatch, as appropriate). Since in the present embodiment the transmission may be triggered by hardware, very short latencies between incoming message and outgoing message may be achieved. Such a feature may be particularly advantageous when implemented in a high-speed real-time application.

In another embodiment, system 1 is adapted to further address the problem of messages getting lost if there is a high bus load on the network. In this embodiment, the controller 4, having the comparator, is configured to identify high priority messages and ensure the reliable reception of such messages, as a priority.

Figure 4:
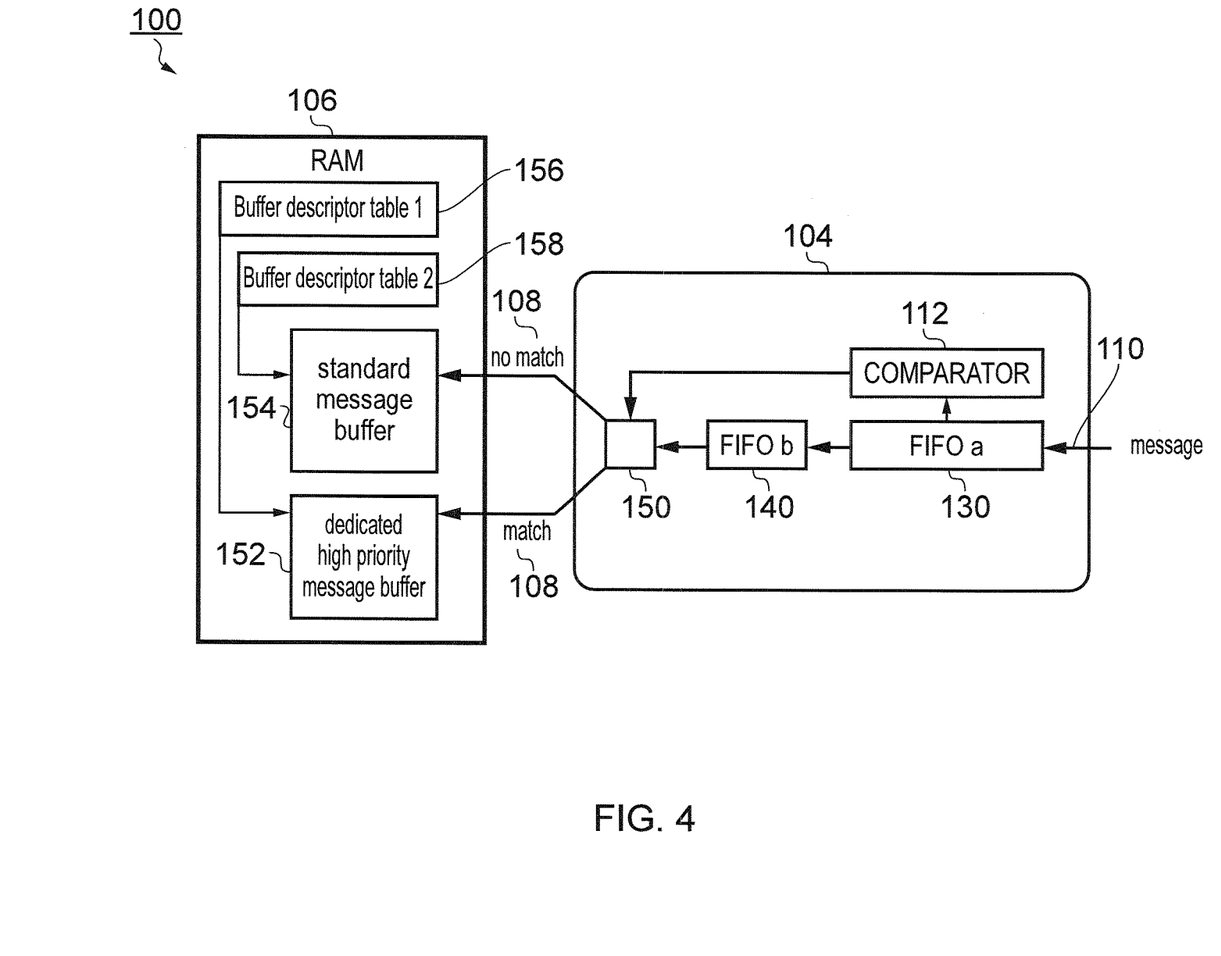
FIG. 4 is a schematic diagram of a further system embodying the present invention.

FIG. 4 is a schematic diagram of a system 100 embodying the present invention. System 100 may, for example, be part of a microcontroller intended to serve as a node on an Ethernet network. System 100 may be considered to be similar to system 1, with features provided to deal with messages of different levels of priority.

System 100 comprises a processor or CPU 102 (not shown), a media-access controller (MAC) 104, a memory 106 such as a random-access memory (RAM), internal connections 108 such as bus connections, external terminals or similar 110 for connection to a network (from which messages may be received), a comparator 112, a FIFO buffer 130, a further FIFO buffer 140, and a decision unit 150. Elements 102, 104, 106, 108, 110, 112, and 130 may be considered to be similar to elements 2, 4, 6, 8, 10, 12, and 30, respectively, and accordingly duplicate description is omitted. FIFO buffer 140 may be considered to correspond to receive buffer 36, or in another embodiment may be provided in addition to receive buffer 36.

Generally speaking, incoming messages may be stored in reserved memory areas, usually in system or dedicated RAM such as memory 106. If the network is highly loaded and messages are received at a high frequency, the CPU 102 may not be able to process the received messages as fast as new messages drop in. The reserved memory area may get full and buffer overflows occur.

In system 100, to reduce the risk of losing important information, the memory 106 is arranged to have first (high priority) and second (standard) buffers 152, 154 and corresponding first and second buffer descriptor tables 156, 158 (for administration of the buffers 152, 154). The first buffer 152 is reserved, i.e. used (for example, exclusively) for messages regarded as important. The second buffer 154 may be used for other messages. The sizes of the first and second buffers may be controlled dynamically, for example based on demand, to optimise buffer usage.

In FIG. 4, it will be appreciated that, to identify high priority messages, the comparator process as previously described may be used, for example in accordance with method 40. For example, one or more compare strings may be employed to detect a high-priority message.

It is envisaged that more than one portion of a received message may need to be subjected to comparison before it is determined that the message is of a high priority. Therefore, for this reason, the FIFO buffer employed during the comparison process (see FIFO buffer 30 in FIG. 2) is effectively provided with a second stage, i.e. two FIFO buffers 130 and 140 are provided, labelled as "a" and "b" in FIG. 4.

The first stage FIFO buffer 130 holds message chunks or portions which are yet to be or are currently being compared, and the second stage FIFO buffer 140 holds message chunks which have already been compared and are ready to be transferred to memory 106. Once the decision has been made as to whether the message is of a high priority or not, a signal may be sent to decision unit 150, in this case from comparator 112. At that point, it is known whether to transfer the message (on the fly) to the first message buffer 152 or the second message buffer 154 and the decision unit may influence or control this process accordingly.

The size of the FIFO buffer 130 depends on the system bus bandwidth and the maximum number of test strings, for example on how fast an incoming message or chunk thereof can be compared and transferred into system memory. The size of the FIFO buffer 140 impacts on the amount of a received message which may be buffered before the priority determination has been completed. In one embodiment, the two FIFO buffers 130 and 140 may be provided as part of a single FIFO buffer, with two pointers used to define their respective lengths. In this way, the lengths of buffers 130 and 140 may be controlled dynamically (for example, by a state machine) to optimize the operation of the system.

Accordingly, in system 100, upon match, the dedicated high priority message buffer 152 is selected to store a high priority message instead of the standard buffer 154. A dedicated interrupt may be employed to signal the reception of such a high priority message to the CPU.

Figure 5:
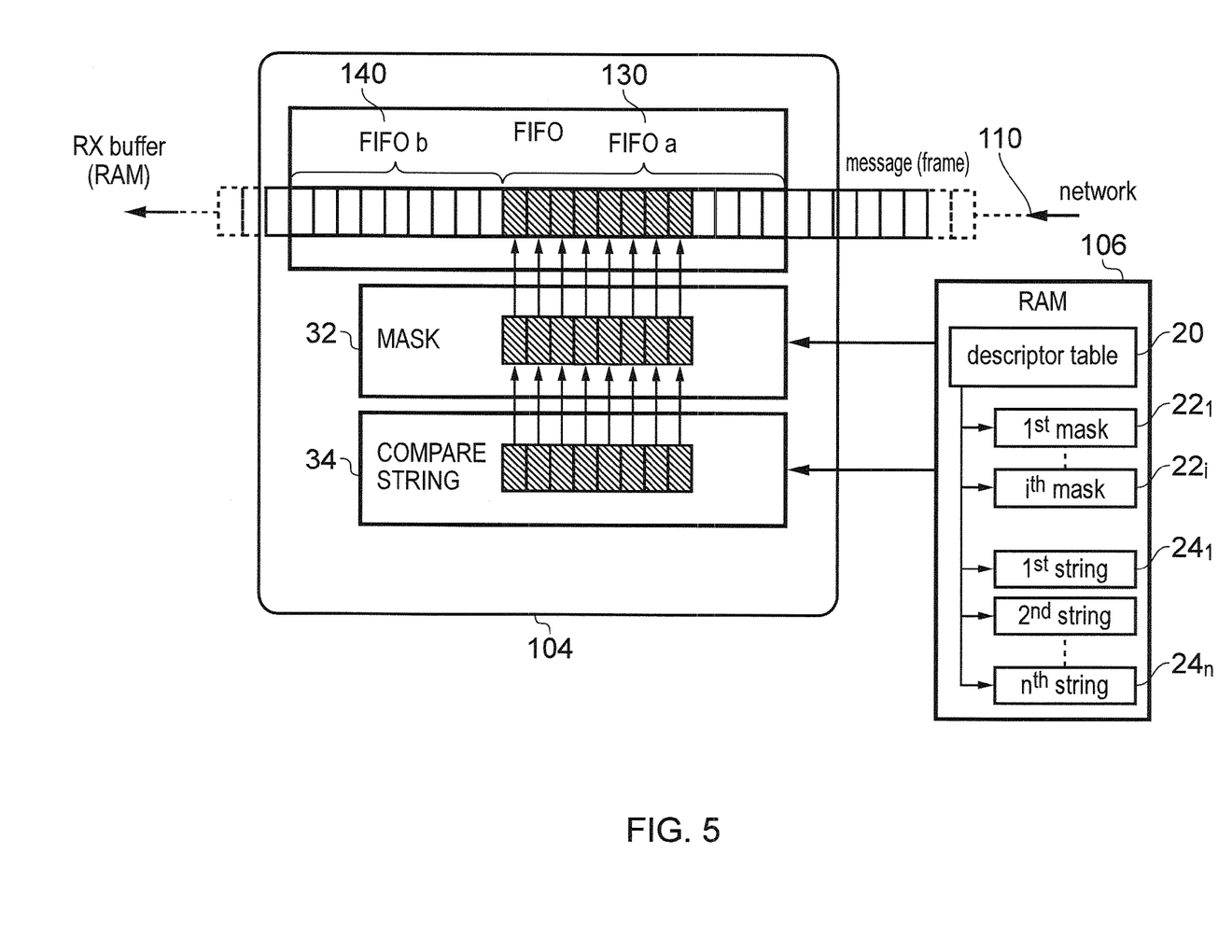
FIG. 5 is a schematic diagram corresponding to that of FIG. 2, but relating to the system of FIG. 4.

FIG. 5 is a schematic diagram corresponding to that of FIG. 2, but relating to system 100 of FIG. 4. To avoid duplication in description, elements previously introduced are denoted in FIG. 5 with like reference numerals.

FIFO buffers 130 and 140 are shown alongside one another, as a single combined FIFO buffer. Memory 106 is shown comprising, in addition to the elements shown in FIG. 4, elements 20, 22 and 24 of FIG. 2.

It will be appreciated that between FIGS. 1 and 2, and between FIGS. 4 and 5, some elements are shown in one of the two Figures but not in the other, for simplicity. However, it will of course be understood that in each case the two Figures are to be considered together.

Embodiments of the present invention may have the capability to employ the controller, e.g. controller 4 or 104, to provide an early interrupt signal to the processor, e.g. CPU 2. That is, the controller may be operable to signal to the processor the beginning of reception of a message. In that way, the processor may be operable, in dependence upon such a signal, to prepare a response to the message at least partly during said reception.

In this way, the time during which a message is being received, which may for example be several milliseconds or tens of milliseconds long depending on the application, may be employed usefully by the processor to prepare such a response. For example, a 64 byte frame (message) may take around 5 ms or 50 ms (depending on the system) to be received. Such time may be usefully employed by the processor, for example in a real-time application.

The response may be, for example, a reply message or some other response such as the output of a response signal. The controller may be operable to determine, early on during reception (which may still be considered to be at the beginning of the reception) whether such a signal should be sent to the processor, so that the processor only receives such a signal for certain (e.g. important) messages.

It will be appreciated that embodiments disclosed herein provide flexible message filtering, reducing the number of incoming messages to be processed by the CPU. Such embodiments allow flexible filter length, flexibility in which parts or fragments of a received message are to be compared (with compare strings and/or mask strings), efficient memory usage, the use of selective mask/filter objects, and efficient handling of prioritised messages (no losing of messages due to high bus load), in a cost-efficient manner.

Statement 1: There is disclosed herein a method to filter messages received from a communication network without the need for interaction with a main processing unit. While the bit stream is received, the message may be compared with a comparison bit stream and a mask bit stream. As long as the result matches, and the predefined number of bits has not been compared and the message bit stream, the compare bit stream and the mask bit stream end has not been reached, the comparison may continue.

Statement 2: There is disclosed herein such a method (see Statement 1) in which the compare- and mask-string size is limited only by available system memory size and can cover the complete message string instead of fixed fragments of the message.

Statement 3: There is disclosed herein such a method (see Statement 1) in which the comparison bit stream and the mask bit stream is obtained from the system memory instead of a fixed memory buffer. This approach allows flexible allocation of memory resources.

Statement 4: There is disclosed herein such a method (see Statement 3) in which a signal indicates that the comparison bit stream or the mask bit stream is obtained from system memory, to allow for a temporarily higher priority of the comparison method in system memory arbitration than usually allocated to the bus participant for message transfers.

Statement 5: There is disclosed herein such a method (see Statement 1) in which a user defined action is taken upon completion of the comparison such that there is one or more of:
- transfer of the message to system memory upon match
- transfer of the message to system memory upon non-match
- discarding of the message upon match
- discarding of the message upon non-match
- transfer a predefined message from system memory to the communication network upon match
- transfer a predefined message from system memory to the communication network upon non-match
- transfer of the message to a dedicated message buffer instead to the standard buffer upon match.

Statement 6: There is disclosed herein a method for special treatment of prioritized messages, in which an incoming bit stream is stored into a small FIFO until a decision is made whether the incoming message is high prioritized. In case it is high prioritized, the FIFO content is transferred to a dedicated buffer location reserved for high prioritized messages and a dedicated interrupt is asserted. In case it is not prioritized, the message is transferred to a standard buffer location and a standard priority interrupt is asserted.

The present invention extends to the following statements:

X1. Apparatus for handling received messages, the apparatus comprising:
a communication-interface controller operable on behalf of a processor to intercept and screen received messages on the fly portion-by-portion during reception, and to submit those messages determined to have passed such screening to the processor for processing.

X2. Apparatus according to statement X1, comprising said processor.

X3. Apparatus according to statement X1 or X2, wherein, for each received message, the controller is operable during the screening to compare user-selected bits of the message with corresponding bits of a test string, and to determine whether the message has passed the screening in dependence upon such comparison.

X4. Apparatus according to statement X3, wherein the controller is operable, when carrying out the comparison, to employ a mask string in conjunction with a said test string so as to mask particular bits of the test string from the comparison.

X5. Apparatus according to statement X3 or X4, wherein the controller comprises a first memory for storing one or more said test strings and/or mask strings.

X6. Apparatus according to statement X5, configured to enable a user to store desired strings in the first memory.

X7. Apparatus according to statement X5 or X6, wherein the controller comprises a second memory for storing a configuration setup corresponding to stored said strings, the configuration setup referring to the strings stored in the first memory.

X8. Apparatus according to statement X7, wherein said first and second memories are parts of the same memory.

X9. Apparatus according to statement X7 or X8, wherein the controller is configured to employ a stored said configuration setup to retrieve corresponding stored said strings from the first memory to carry out the screening.

X10. Apparatus according to any of statements X7 to X9, wherein the controller is operable to employ a stored said configuration setup to determine which combinations of stored test and/or mask strings are to be compared against received messages.

X11. Apparatus according to any of statements X7 to X10, configured to enable a user to store desired strings in the first memory and a corresponding configuration setup in the second memory, so as to configure the controller to subject any desired bits of a said received message to comparison with one or more desired said test string and/or mask string.

X12. Apparatus according to any of statements X3 to X11, wherein the controller is configured, for each received message, to carry out the comparison in a series of stages, each stage comprising comparing a portion of a received message with a corresponding portion of a said test string and/or a said mask string.

X13. Apparatus according to statement X12, wherein the controller comprises a FIFO buffer, and is configured to carry out the stages sequentially during reception of the message concerned, successive stages operating on respective portions of a particular received message successively received into the FIFO buffer.

X14. Apparatus according to statement X12 or X13 when read as appended to statement X7, wherein the controller is configured, in each said stage, to compare the portion of a said received message concerned with a corresponding portion of each stored test string and/or mask string, or of each stored test string and mask string combination, as indicated by a said stored configuration setup.

X15. Apparatus according to any of the preceding statements, wherein the controller is operable, in dependence on the screening, to determine whether received messages are of a first priority or of a second priority, the first priority being higher in priority than the second priority.

X16. Apparatus according to statement X15, wherein the controller comprises first and second message buffers, and is operable to store messages determined to have the first priority in the first message buffer and messages determined to have the second priority in the second message buffer, the first buffer being reserved for such first-priority messages.

X17. Apparatus according to statement X15 or X16, wherein the controller is operable to signal receipt of such a first-priority message to the processor.

X18. Apparatus according to any of statements X15 to X17 when read as appended to statement X13, wherein said FIFO buffer is a first FIFO buffer, and wherein the controller has a second FIFO buffer for holding screened portions of a particular received message whilst such determination as to whether the message concerned is of the first or second priority is completed, which screened portions have already been subjected to comparison whilst held in the first FIFO buffer.

X19. Apparatus according to statement X18, wherein the first and second FIFO buffers are parts of a single FIFO buffer, and wherein the controller is operable to dynamically control the lengths of the first and second FIFO buffers within the single FIFO buffer.

X20. Apparatus according to any of the preceding statements, wherein the controller is operable, for messages determined to have passed the screening, to transmit a predefined reply message.

X21. Apparatus according to any of the preceding statements, comprising said processor, wherein:
the controller is operable to signal to the processor the beginning of reception of a said message; and
the processor is operable, in dependence upon such a signal, to prepare a response to the message at least partly during said reception.

X22. Apparatus according to any of the preceding statements, wherein the controller is implemented in hardware.

X23. A microcontroller comprising apparatus according to any of the preceding statements.

X24. A method of handling received messages, the method comprising:
    on behalf of a processor, intercepting and screening received messages on the fly portion-by-portion during reception, and submitting only those messages determined to have passed such screening to the processor for processing.

The invention claimed is:

1. Apparatus for handling received messages, the apparatus comprising:
    system memory for storing one or more test or mask strings and a corresponding configuration setup referring to the strings; and
    a communication-interface controller operable on behalf of a processor to intercept and screen received messages on the fly portion-by-portion during reception, and to submit messages determined to have passed such screening to the processor for processing,
    wherein the controller is configured to:
        for each received message, carry out a comparison during the screening in a series of stages, each stage comprising comparing a portion of each received message, with a corresponding portion of one of the one or more test or mask strings,
        carry out the series of stages sequentially during the reception of the messages, successive stages operating on respective portions of a particular received message successively received into a first-in-first out (FIFO) buffer,
        in each said stage, compare the portion of the received message in the FIFO buffer sequentially with a corresponding portion of each stored test string and/or mask string or of each stored test string and mask string combination, as indicated by the stored configuration set up, and
        in each said stage and for each sequential comparison, fetch the corresponding portion from the system memory.

2. Apparatus as claimed in claim 1, wherein, for each received message, the controller is operable during the screening to compare user-selected bits of the message with corresponding bits of a test string, and to determine whether the message has passed the screening in dependence upon such comparison.

3. Apparatus as claimed in claim 2, wherein the controller is operable, when carrying out the comparison, to employ a mask string in conjunction with a said test string so as to mask particular bits of the test string from the comparison.

4. Apparatus as claimed, in claim 2, wherein the apparatus is configured to store the one or more said strings in a first part of the memory.

5. Apparatus, as claimed in claim 4, wherein the apparatus is configured to store said configuration setup in a second part of the memory, and to dynamically control the sizes of the first and second parts of the memory based on a demand for space in the first and second parts of the memory.

6. Apparatus as claimed in claim 5, wherein the apparatus is configured to enable a user to store desired strings in the first part of the memory and a corresponding configuration setup in the second part of the memory, so as to configure the controller to subject any desired bits of each received message to comparison with one or more desired said test string and/or mask string.

7. Apparatus as claimed in claim 1, wherein the controller is operable, in dependence on the screening, to determine whether received messages are of a first priority or of a second priority, the first priority being higher n priority than the second priority.

8. Apparatus as claimed in claim 7, wherein the controller comprises first and second message buffers, and is operable to store messages determined to have the first priority in the first message buffer and messages determined to have the second priority in the second message buffer, the first buffer being reserved for such first-priority messages.

9. Apparatus as claimed in claim 7, wherein said FIFO buffer is a first FIFO buffer, and wherein the controller comprises a second FIFO buffer for holding screened portions of a particular received message whilst such determination as to whether the message concerned is of the first or second priority is completed, which screened portions have already been subjected to comparison whilst held in the first FIFO buffer.

10. Apparatus according to claim 1, wherein the controller is operable, for messages determined to have passed the screening, to transmit a predefined reply message.

11. Apparatus according to claim 1, wherein:
    the controller is operable to signal to the processor a beginning of a reception of each received message; and
    the processor is operable, in dependence upon such a signal, to prepare a response to each received message at least partly during said reception.

* * * * *